United States Patent
Sakamoto et al.

[11] 4,289,284
[45] Sep. 15, 1981

[54] TAPE CONTROL APPARATUS

[75] Inventors: Hitoshi Sakamoto, Zama; Kazuhiro Takano, Atsugi, both of Japan

[73] Assignee: Sony Corporation, Tokyo, Japan

[21] Appl. No.: 969,194

[22] Filed: Dec. 13, 1978

[30] Foreign Application Priority Data

Dec. 15, 1977 [JP] Japan .............................. 52-149935

[51] Int. Cl.³ ........................ B65H 59/38; G03B 1/04; G11B 15/32
[52] U.S. Cl. ................................................ 242/186
[58] Field of Search ..................... 242/191, 186, 75.51; 318/6, 606, 608

[56] References Cited

U.S. PATENT DOCUMENTS

| | | | |
|---|---|---|---|
| 3,560,827 | 2/1971 | Schiller | 318/606 |
| 3,800,196 | 3/1974 | Zimmermann | 318/6 |
| 3,938,757 | 2/1976 | Sargunar | 242/186 |
| 4,160,195 | 7/1979 | Sakamoto | 242/75.52 |

Primary Examiner—Leonard D. Christian
Attorney, Agent, or Firm—Lewis H. Eslinger; Alvin Sinderbrand

[57] ABSTRACT

Apparatus controls the torque applied by a motor to a reel, such as the supply reel of a video tape recorder, so that the tape drawn from such supply reel by a tape transport system is transported with a substantially constant tape tension. The apparatus includes a device for detecting the rotational speed of the supply reel and for generating an output signal, for example, in the form of a voltage the value of which varies with a change in the rotational speed and which has a rate of change corresponding to the rate of the change of the rotational speed. A device receives the output signal from the rotational speed detecting device and generates a motor control signal which varies in response to changes in the output signal, with the relationship of the variation of the motor control signal to the variation of the output signal being dependent upon the rate of change of the output signal. For example, slow changes in the output signal, which correspond to increases in the rotational speed of the supply reel caused by decreases in the radius of the tape wound upon that reel, cause the motor control signal to decrease the torque applied by the motor to the supply reel, while rapid changes in the output signal, which correspond to rapid increases in the rate of rotation of the supply reel caused by motion and mechanical vibration, cause the motor control signal to increase the torque applied by the motor to said supply reel so as to resist such rapid increases in reel speed.

11 Claims, 4 Drawing Figures

TAPE CONTROL APPARATUS

BACKGROUND OF THE INVENTION

1. Field of the Invention

The present invention relates to a tape control apparatus and, more particularly, to such apparatus for controlling the tension of a tape which is transported by capstan and pinch roller between a supply reel and a take-up reel.

2. Description of the Prior Art

In a typical magnetic video recording and/or reproducing apparatus, such as a video tape recorder (VTR), the magnetic tape is normally transported between a pair of reels, so that tape is drawn from a supply reel, then driven by a capstan and pinch roller, and finally wound up on a take-up reel. This basic manner of transportation is the same in so-called open reel machines or in cassette or cartridge machines wherein both the reels are provided in a single, easily manipulatable housing. In all cases it is desirable that the tape be transported with a substantially constant tension, and in general this is achieved by controlling a counter-torque which is applied to the supply reel to create a controlled back-tension in the transported tape.

One factor affecting the maintenance of a constant tape tension is the change in the effective diameter of the supply reel as tape is wound off it. According to the principle of leverage, as this effective diameter decreases, the amount of countertorque which must be applied to the supply reel in order to create a given back-tension on the tape also decreases. Thus, it is desirable to detect the effective diameter of the supply reel, so that the counter-torque which is applied thereto can be modified accordingly. While such effective diameter can be detected by using a mechanical follower in combination with a photosensing device, this type of arrangement may not provide the accuracy which is needed to maintain satisfactorily a constant tape tension.

In a tape control apparatus described in U.S. Pat. No. 3,800,196, a sensing means is provided for developing an electrical signal corresponding to the angular velocity of a supply reel, which is inversely proportional to the effective diameter of the supply reel. The electrical signal is fed to a motor driving circuit, in which a counter-torque generated by the supply reel motor is controlled in response to the frequency of the electrical signal. This countertorque provides a controlled tension in the tape. Thus, irrespective of the change of the effective diameter of the supply reel, the tape is transported with a substantially constant tension.

As described above, therefore, it is possible to effect substantially complete compensation for static tape tension variations which result from the above discussed change in the effective diameter of the supply reel. These static tape tension variations are those occurring during normal, that is to say, steady-state operation. Additionally, however, there are dynamic tape tension variations. These occur because of sudden changes in the rotational speed of the supply reel caused by external disturbances, such as movement, vibration or mechanical shock of the VTR itself. For example, if the supply reel speed suddenly decreases by reason of movement of the VTR, the aforementioned apparatus will operate so as to increase the torque exerted on the supply reel. This means that the rotational speed of the supply reel will be further decreased by the increased counter-torque and the tape tension increased. Thus, it is apparent that the afore-mentioned apparatus cannot satisfactorily compensate for dynamic tape tension variation. Since portable VTRs for professional use are now being produced, it is apparent that there is an immediate requirement for some means to compensate for such dynamic tape tension variations.

SUMMARY OF THE INVENTION

Accordingly, it is an object of the present invention to provide apparatus for controlling torque applied by a motor to a supply reel which avoids the afore-noted problems of prior art systems.

Another object of this invention is to provide apparatus for controlling torque applied by a motor to a supply reel which causes tape drawn from the supply reel by a tape transport system to be transported with a substantially constant tape tension.

Still another object of this invention is to provide apparatus for controlling the torque applied by a motor to a supply reel which compensates for dynamic tape tension variation which results, for example, from mechanical vibration.

Yet another object of this invention is to provide apparatus for controlling the torque applied by a motor to a supply reel which compensates dynamic tape tension variation as well as static tape tension variation caused by changes in the effective diameter of the tape supply reel.

In accordance with an aspect of this invention, apparatus for controlling the torque applied by a motor to a supply reel, so that tape is drawn from the supply reel by a tape transport system with a substantially constant tape tension, is provided with means for detecting the rotational speed of the supply reel and for generating an output signal which varies with a change in the rotational speed of the supply reel. The output signal has a rate of change which corresponds to the rate of change of the rotational speed of the supply reel, and is received by means for generating a a motor control signal which varies in response to changes in such output signal. The relationship of the variation of the motor control signal to the variation of the output signal is dependent upon the rate of change of the output signal. In addition the apparatus includes means for controlling the torque applied by the motor to the supply reel in dependence upon the motor control signal.

In accordance with a feature of this invention, the relationship between the variation of the motor control signal and the variation of the output signal is the inverse of what it is for rates of change of the output signal below a first predetermined value when the rate of change of the output signal is increased beyond a second predetermined value.

In accordance with another feature of this invention, the means for generating a motor control signal includes means for causing the motor control signal to vary as a function of the substantially instantaneous value of the output signal and change sensing means having means for holding a storage value which is influenced by a past value of the output signal for causing the motor control signal to vary as a function of the difference between the substantially instantaneous value of the output signal and the storage value. For example, in a preferred embodiment, the output signal is in the form of a varying voltage, and the means for generating a motor control signal includes an input terminal to which this voltage is applied, and the means for holding a storage value includes a capacitor and the change sensing means includes a resistor connected between the input terminal and the capacitor for causing the storage value to change toward the instantaneous value of the output signal.

The above, and other objects, features, and advantages of the invention, will be apparent in the following detailed description of an illustrative embodiment of the invention which is to be read in connection with the accompanying drawings.

DESCRIPTION OF THE PREFERRED EMBODIMENT

As an example, an embodiment of the invention suitable for use in a VTR will now be described with reference first to FIG. 1.

Figure 1:
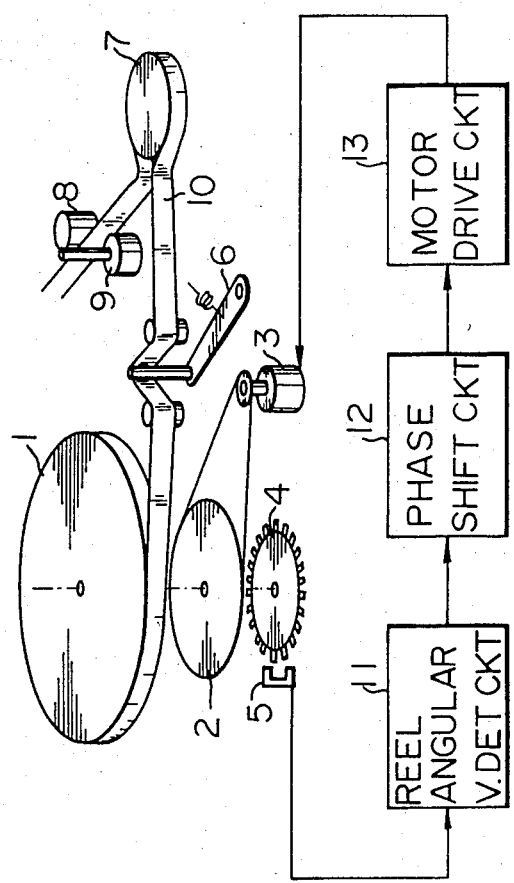
FIG. 1 shows one embodiment of apparatus for controlling the torque applied by a motor to a supply reel, according to the present invention.

In FIG. 1, there is shown a magnetic tape 10 wound on a supply reel 1 and driven by a capstan 9 and a pinch roller 8 so as to be transported in a tape path which includes a compliance arm 6 and a rotational drum 7, the last of which is provided in a known manner with video heads, or transducers (not shown). A supply reel motor 3 exerts a counter-torque on the supply reel 1 through a pulley 2 mounted on the rotational shaft thereof. A disc 4 having a toothed periphery is attached to the shaft which carries the supply reel 1 and the pulley 2, and the shaft is driven by the supply reel motor 3. A sensing element 5 is provided adjacent to the disc 4, and comprises a light source positioned on one side of the disc 4 and a photodetector positioned on the other side of the disc 4. On rotation of the supply reel 1 and hence the disc 4, the sensing element 5 generates a periodic rectangular waveform signal having a frequency which is dependent on the angular velocity, or rotational speed, of the supply reel 1. In the apparatus shown in the Figures the frequency of this periodic waveform is approximately 100 kilohertz.

The apparatus for controlling the torque applied by the motor 3 to the supply reel 1 includes a reel servo system comprising the sensing element 5 discussed above, a reel angular velocity detecting circuit 11 which receives the periodic waveform from the sensing element 5 and generates an output signal which varies with changes in the frequency of that periodic waveform and which has a rate of change corresponding to its rate of change, a phase shift circuit 12 which receives the output signal from the detecting circuit 11 and generates a motor control signal which varies in response to changes in that output signal, with the relationship of the variation of the motor control signal to the variation of the output signal being dependent on the rate of change of the output signal, and, a motor drive circuit 13 which controls the torque supplied by the motor 3 to supply reel 1 in dependence on the motor control signal from circuit 12.

The tape 10 is driven by the capstan 9, when pinched between the capstan 9 and the pinch roller 8, at a constant speed during normal operation. It is desirable that the portion of tape 10 which is guided around the rotating drum 7 should have a constant tension, in order to achieve stable recording and reproducing operations. A variable counter-torque is exerted on the supply reel 1 by the supply reel motor 3 to maintain such constant tape tension. The amount of such variable counter-torque which is supplied by motor 3, in turn, is controlled by the above-mentioned servo system in dependence on the rotational speed of the supply reel 1.

Figure 2:
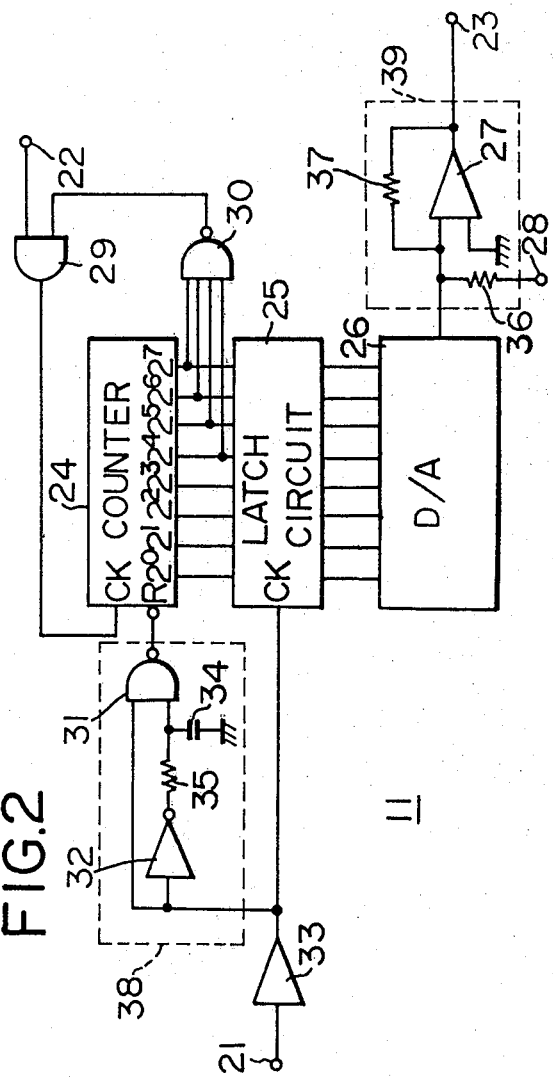
FIG. 2 shows a circuit for detecting the rotational speed of a supply reel suitable for use in the apparatus of FIG. 1.

One example of the reel angular velocity detecting circuit 11 is shown in FIG. 2. The detecting circuit 11 comprises a reset pulse forming circuit 38, a counter 24, a latch circuit 25, a digital-to-analog converter (D/A converter) 26, and a compensating circuit 39.

The periodic rectangular waveform signal supplied to an input terminal 21 by the sensing element 5 is amplified by an amplifier 33, and is supplied to the reset pulse forming circuit 38, and to a clock terminal CK of the latch circuit 25, in which outputs of the 8-bit counter 24 are latched at every rinsing edge of the rectangular waveform signal supplied thereto. The reset pulse forming circuit 38 comprises a NAND circuit 31 to which the rectangular waveform signal is supplied directly, an inverter 32, and an integrator formed by a resistor 35 and a capacitor 34. The rectangular waveform signal after inversion by the inverter 32 is delayed by a short time in the integrator. The delayed rectangular waveform signal is supplied to the NAND circuit 31, so that a pulse signal identifying a falling edge of the inverted rectangular waveform signal is generated therefrom. The pulse signal from the NAND circuit 31 is supplied to the reset terminal R of the counter 24 as a reset pulse.

A clock signal, which may have a frequency of about 12 megahertz, is supplied to a terminal 22 and via an AND circuit 29 to the clock terminal CK of the counter 24. The frequency of the periodic rectangular waveform signal is converted to a corresponding digital code, by counting the clock pulses which occur during each period of the waveform. It is to be noted that the more significant bits in the counter 24, for example those corresponding to $2^4$, $2^5$, $2^6$ and $2^7$, are all supplied through a NAND circuit 30 to the AND circuit 29 in order to prevent the counter 24 from over-flowing.

The output terminals of the counter 24 are connected to the 8-bit latch circuit 25, in which the 8-bit output of counter 24 is latched at the time of the rising edge of the periodic rectangular waveform signal. The output terminals of the latch circuit 25 are connected to the D/A converter 26 for converting the digital code from the latch circuit 25 to a corresponding output signal in the form of a voltage.

During normal operation of the VTR the outputs of the latch circuit 25 are inversely proportional to the rotational speed of the supply reel 1 and directly proportional to the effective diameter of that supply reel. Thus, it can be seen that if the counter-torque supplied by the supply reel motor 3 is controlled in directly proportional response to the output signal of D/A converter 26, the back-tension exerted on the tape 10 will be compensated for changes in effective diameter of the supply reel 1.

The output signal of the D/A converter 26 can be modified to include a component influenced by friction at a tension arm or at the reel shaft. The compensating circuit 39 can be connected to the output of the D/A converter 26 for this purpose. The compensating circuit 39 comprises an operational amplifier 27, a resistor 37 connected between the output terminal and the inverting input terminal of the operational amplifier 27 and a resistor 36 connected to the inverting input terminal thereof. A voltage source terminal 28 provides a negative bias, which varies in response to such friction, to the input of the operational amplifier 27 through a resistor 36. As a result the output signal of compensating circuit 39 compensates the output of the D/A converter 26 in response to such friction. The compensated output signal is supplied by way of a terminal 23 to the phase shift circuit 12.

Figure 3:
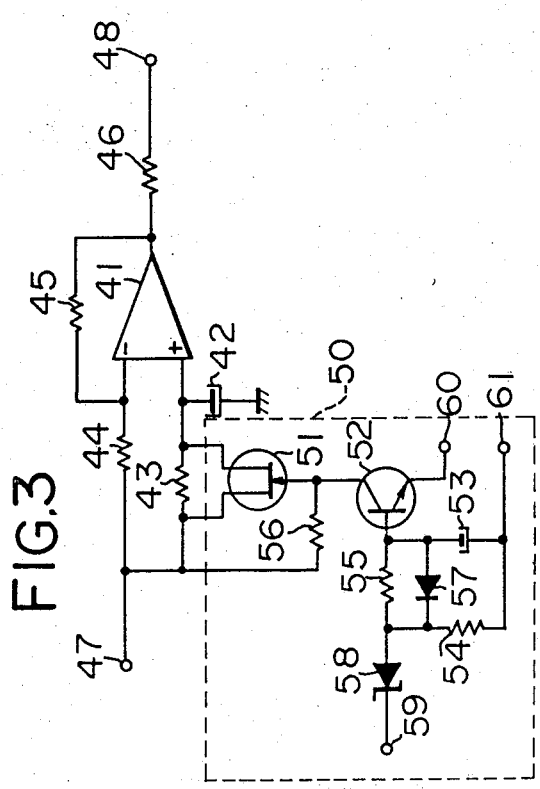
FIG. 3 shows a circuit for generating a motor control signal suitable for use in the apparatus of FIG. 1.

FIG. 3 shows a circuit diagram embodying the phase shift circuit 12. The phase shift circuit 12 comprises an operational amplifier 41, an input circuit and a feedback circuit of the amplifier 41 for determining a frequency characteristic of the amplifer 41, and a start control circuit 50. The input and feedback circuits of the operational amplifier 41 include resistors 43 and 44 which are connected respectively between an input terminal 47 and a noninverting input of the operational amplifier 41, and between the input terminal 47 and an inverting input thereof, a capacitor 42 connected to the noninverting input of the amplifier 41, and a feedback resistor 45 for feedback of the operational amplifier 41. The output of the operational amplifier 41, the motor control signal, is supplied through a resistor 46 to an output terminal 48, which is connected to the motor drive circuit 13 which, in turn, controls the torque applied by the motor 3 in dependence on the motor control signal.

The transfer function of the operational amplifier having the above input and feedback circuits is expressed by the following equation:

$$\frac{V_O}{V_I} = \frac{1 - 10CRS}{1 + CRS}$$

where $V_I$ and $V_O$ denote an input voltage and an output voltage, respectively, C is the capacitance of the capacitor 42, R is the resistance of the resistors 43 and 44, the resistor 45 has a resistance 10R, and S is equal to $j\omega$.

Figure 4:
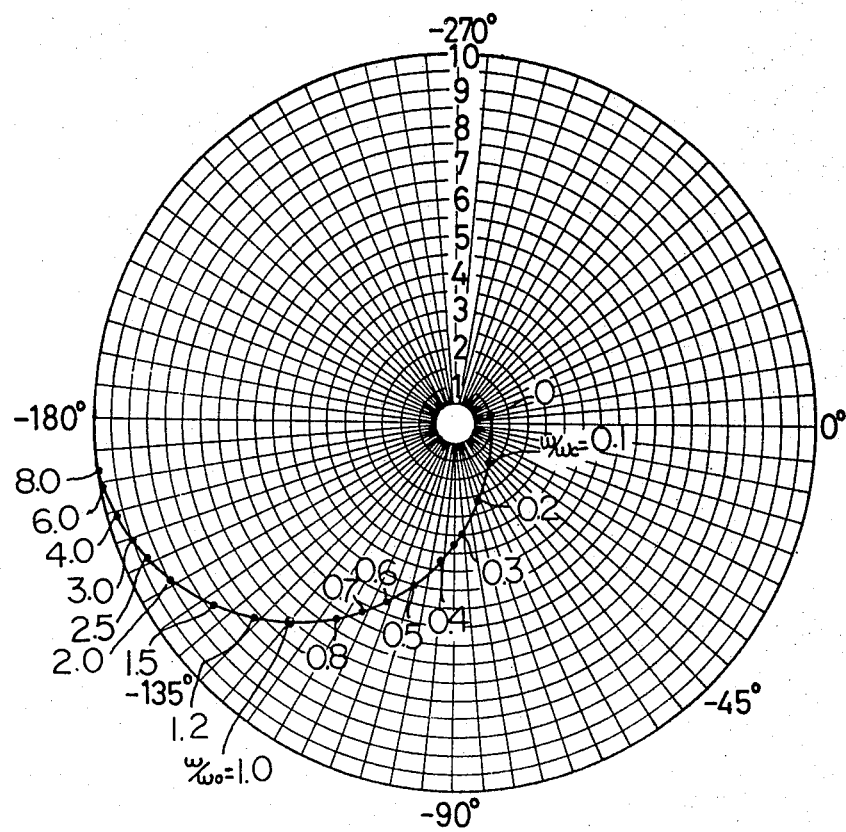
FIG. 4 is a graph showing a transfer characteristic of the apparatus of FIG. 1.

FIG. 4 is a graph showing a transfer characteristic of the phase shift circuit 12, when C is equal to the 10 microfarads, R is equal to 91 kilohms, and $\omega_c$ is determined by 1/CR.

As shown in FIG. 4, the transfer function is equal to unity for direct current, resulting in the output of the phase shift circuit 12 being in phase with the input. The phase of the output varies in accordance with the frequency of the input. In the higher frequency region, the output is obtained in completely opposite phase to the input and with a relatively high gain.

The resistors 44 and 45 and the operational amplifier 41 cause the motor control signal to vary as a function of the substantially instantaneous value of the output signal supplied to terminal 47. The capacitor 42 provides means for holding a storage value or voltage which is influenced by a past value of the output signal. The resistor 43 provides means for causing the storage value on the capacitor 42 to change toward the instantaneous value of the output signal at a limited rate. In conjunction with operational amplifier 41, the capacitor 42 and the resistor 43 cause the motor control signal to vary as a function of the difference between the substantially instantaneous value of the output signal supplied to terminal 47 and the storage value on the capacitor 42. According to the well known characteristics of operational amplifiers, the output of the operational amplifier 41 varies in such a manner that the total voltage drop between terminal 47 and the output of amplifier 41 is sufficient to make the voltage drop across resistor 44 equal to the difference between the voltage at terminal 47 and the voltage at the non-inverting input of the operational amplifier. Thus, the motor control signal at the output of that operational amplifier corresponds to the substantially instantaneous value of the output signal supplied to terminal 47 minus a value which corresponds directly to the difference between such instantaneous value and the storage value on capacitor 42.

When the output signal supplied to the terminal 47 remains constant or changes slowly relative to the rate at which capacitor 42 charges through resistor 43, there will be little or no difference between the voltage of the output signal supplied to terminal 47 and the voltage on capacitor 42. As a result, the motor control signal at the output of operational amplifier 41 will equal the output signal supplied to terminal 47 and the voltage of the motor control signal will vary directly with slow changes in that output signal.

Since slow changes in the output signal supplied to terminal 47 cause directly corresponding changes in the motor control signal, a torque is exerted on the supply reel 1 in proportion to the rotor period of the supply reel 1, that is, in inverse proportion to that reel's rotational speed. Thus, the tape tension is maintained constant irrespective of static tape tension variations caused by changes in the effective diameter of the supply reel 1.

On the other hand, when the output signal supplied to terminal 47 changes at a rapid rate relative to the rate at which capacitor 42 can be charged through resistor 43, a voltage difference will arise between the output signal and capacitor 42. As a result, the motor control signal generated by operational amplifier 41 will differ from the output signal supplied to terminal 47 by an amount proportional to such voltage difference. Where resistors 44 and 45 have resistances of R and 10R, respectively, the voltage of the motor control signal generated by operational amplifier 41 will be less than the voltage of the output signal by 11 times the amount of such voltage difference. As a result, rapid increases in the output signal supplied to terminal 47 cause brief decreases in the motor control signal generated by operational amplifier 41. Similarly, rapid decreases in the output signal cause brief increases in the motor control signal. Thus, in response to rapid changes in the rotational speed of supply reel 1, such as those caused by mechanical vibration or rotation of the VTR, the reel servo system of FIG. 1 operates in a negative feedback mode, and serves as a speed control system. The system operates to keep the rotational speed of the supply reel 1 completely free of random fluctuation. The tape transporting system in use with this circuit shows a stable anti-rolling characteristic in cooperation with the compliance arm 6.

The start control circuit 50 puts the phase shift circuit 12 into the off state for starting transport of the tape 10. This is necessary because the phase shift circuit 12 operates to suppress rapid variation of the rotational speed of the supply reel 1, so the rotational speed cannot be rapidly increased, as required for starting, unless the function of the phase shift circuit 12 is suppressed.

The start control circuit 50 comprises a switching means, field effect transistor (FET) 51, connected in parallel with the resistor 43, and a control transistor 52 connected to the gate of the FET 51. A start signal is supplied from a terminal 59 through a Zener diode 58 and a resistor 55 to the base of the transistor 52. A time constant circuit is formed by the resistor 55, a diode 57 connected across the resistor 55, and a resistor 54 and a capacitor 53 connected respectively between a terminal 61 and the cathode of the diode 57, and between the terminal 61 and the anode of the diode 57. The capacitor 53 is charged with a relatively large time constant determined by the resistor 55 and the capacitor 53, and is discharged with a relatively small time constant determined by the resistor 54, diode 57 and the capacitor 53. The emitter of the transistor 52 is connected to a terminal 60, to which a negative voltage source sufficient to turn off the FET 51 is supplied. A predetermined negative voltage is supplied to the terminal 61.

When a signal which goes high upon the forward transport of the tape 10 is supplied to the terminal 59, the capacitor 53 is gradually charged up with the relatively large time constant. Since the transistor 52 remains off until the charging voltage of the capacitor 53 reaches a predetermined level, the FET 51 is brought into conduction by a forward bias voltage supplied through a resistor 56 connected between the gate of the FET 51 and the terminal 47. When the charging voltage of the capacitor 53 reaches the predetermined level, the transistor 52 turns on. As a result, the negative bias voltage at the terminal 60 is supplied to the FET 51 to turn that FET off.

Thus for a predetermined interval following the commencement of the transporting of tape 10, transistor 51 remains in an ON state providing a low resistance path between terminal 47 and capacitor 42. During this interval, owing to the very rapid rate at which charge can be transferred through transistor 51, there is virtually no difference between the voltage on capacitor 42 and the output signal supplied to terminal 47. As a result, the motor control signal generated by the operational amplifier 41 follows the output signal supplied to terminal 47, independently of the rate of change of that output signal.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope or spirit of the invention as defined by the appended claims.

We claim:

1. Apparatus for controlling the torque applied by a motor to a supply reel so that tape drawn from said supply reel by a tape transport system is transported with a substantially constant tape tension, said apparatus comprising: means for detecting the rotational speed of said supply reel and generating an output signal which varies with a change in said rotational speed and which has a rate of change corresponding to the rate of said change of the rotational speed; phase controlling means for controlling the phase of said output signal in response to said rate of change of said output signal; means receiving said output signal from said phase controlling means for generating a motor control signal which varies in response to changes in said output signal; and means for controlling the torque applied by said motor in dependence on said motor control signal.

2. Apparatus according to claim 1, wherein said phase controlling means controls said output signal in such a manner that the relationship of the variation of said motor control signal to the variation of said output signal is the inverse of what it is for rates of changes of said output signal below a first predetermined value when said rate of change is increased beyond a second predetermined value.

3. Apparatus for controlling the torque applied by a motor to a supply reel so that tape drawn from said supply reel by a tape transport system is transported with a substantially constant tape tension, said apparatus comprising: means for detecting the rotational speed of said supply reel and generating an output signal which varies with a change in said rotational speed and which has a rate of change corresponding to the rate of said change of the rotational speed; means receiving said output signal for generating a motor control signal which varies in response to changes in said output signal with the relationship of the variation of said motor control signal to the variation of said output signal being dependent on said rate of change of the output signal; and means for controlling the torque applied by said motor in dependence on said motor control signal, wherein said relationship of the variation of said motor control signal to the variation of said output signal is the inverse of what it is for rates of change of said output signal below a first predetermined value when said rate of change is increased beyond a second predetermined value.

4. Apparatus for controlling the torque applied by a motor to a supply reel so that tape drawn from said supply reel by a tape transport system is transported with a substantially constant tape tension, said apparatus comprising: means for detecting the rotational speed of said supply reel and generating an output signal which varies with a change in said rotational speed and which has a rate of change corresponding to the rate of said change of the rotational speed; means receiving said output signal for generating a motor control signal which varies in response to changes in said output signal with the relationship of the variation of said motor control signal to the variation of said output signal being dependent on said rate of change of the output signal; and means for controlling the torque applied by said motor in dependence on said motor control signal, in which said means for generating a motor control signal includes an input terminal receiving said output signal an amplifier having inverting and non-inverting inputs and an output, first and second resistors connected between said input terminal and said inverting input and between said input terminal and said non-inverting input, respectively, a feedback resistor connected between said output of the amplifier and said inverting input, and a capacitor connected to said non-inverting input of said amplifer.

5. Apparatus according to claim 4, in which said means for generating a motor control signal further includes switching means connected in parallel with said second resistor, said switching means being in an on ON-state for a predetermined interval following the commencement of transporting of said tape so as to suppress, as said supply reel first begins to rotate, the extent to which the relationship of the variation of said motor control signal to the variation of said output signal depends on said rate of change of the output signal.

6. Apparatus for controlling the torque applied by a motor to a supply reel so that tape drawn from said supply reel by tape transport system is transported with a substantially constant tape tension, said apparatus comprising: means for detecting the rotational speed of said supply reel and generating an output signal which varies with a change in said rotational speed and which has a rate of change corresponding to the rate of said change of the rotational speed; means receiving said output signal for generating a motor control signal which varies in response to changes in said output signal, said means for generating a motor control signal including means for causing said motor control signal to vary as a function of the substantially instantaneous value of said output signal, and change sensing means having means for holding a storage value which is influenced by a past value of said output signal for causing said motor control signal to vary as a function of the difference between said substantially instaneous value of said output signal and said storage value; and means for controlling the torque applied by said motor in dependence on said motor control signal.

7. Apparatus according to claim 6, wherein said change sensing means includes means for causing said storage value to change toward said instantaneous value of said output signal at a limited rate.

8. Apparatus according to claim 7, wherein said output signal is in the form of a voltage, said means for generating a motor control signal includes an input terminal to which said voltage is applied, said means for holding a storage value includes a capacitor and said means for causing said storage value to change toward the instantaneous value of said output signal includes a resistor connected between said input terminal and said capacitor.

9. Apparatus according to claim 6, wherein said means for generating a motor control signal causes said motor control signal to correspond to said substantially instantaneous value of said output signal less a value which corresponds directly with the difference between said substantially instantaneous value of said output signal and said storage value.

10. In a video tape recorder of the tape including a tape transport system for transporting a magnetic tape from a supply reel, around a guide drum having transducers for recording and reproducing signals on said tape, and then to a take up reel; a tape tension control apparatus for controlling the torque applied by a supply reel motor to said supply reel, comprising: means for detecting the rotational speed of said supply reel and generating a periodic waveform the frequency of which is dependent on the rotational speed of said supply reel; means for receiving said periodic waveform and for generating an output signal which varies with a change in said frequency of said periodic waveform and which has a rate of change corresponding to the rate of said change of the frequency of the periodic waveform; means receiving said output signal for generating a motor control signal which varies in response to changes in said output signal, with the relationship of the variation of said motor control signal to the variation of said output signal being dependent on said rate of change of the output signal; and means for controlling the torque applied by said motor in dependence on said motor control signal.

11. A video tape recorder according to claim 10, further comprising means for suppressing, upon commencement of rotation of said supply reel, the dependency of the relationship of the variation of said motor control signal to the variation of said output signal on said rate of change of the output signal.

* * * * *